United States Patent
Coussemaeker et al.

(10) Patent No.: US 9,378,741 B2
(45) Date of Patent: Jun. 28, 2016

(54) SEARCH RESULTS USING INTONATION NUANCES

(71) Applicant: Microsoft Corporation, Redmond, WA (US)

(72) Inventors: Didier Coussemaeker, Paris (FR); Loic Deniel, Bellevue, WA (US); Hoon Kong, Seattle, WA (US); Nicolas Mai, Seattle, WA (US); Narayan Krishnamoorthy, Kirkland, WA (US); Ty Long Na, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 13/795,748

(22) Filed: Mar. 12, 2013

(65) Prior Publication Data
US 2014/0278400 A1      Sep. 18, 2014

(51) Int. Cl.
| | |
|---|---|
| *G10L 17/00* | (2013.01) |
| *G10L 15/26* | (2006.01) |
| *G10L 15/06* | (2013.01) |
| *G06F 17/30* | (2006.01) |
| *G10L 15/22* | (2006.01) |

(Continued)

(52) U.S. Cl.
CPC ........ *G10L 15/265* (2013.01); *G06F 17/30764* (2013.01); *G06F 17/30867* (2013.01); *G10L 15/06* (2013.01); *G06Q 30/0251* (2013.01); *G06Q 30/0269* (2013.01); *G10L 15/22* (2013.01); *G10L 15/32* (2013.01); *G10L 17/26* (2013.01); *G10L 25/00* (2013.01); *G10L 25/75* (2013.01); *G10L 2015/221* (2013.01)

(58) Field of Classification Search
CPC .......... G06Q 30/0251; G06Q 30/0269; G06Q 30/0271; G10L 15/01; G10L 15/06; G10L 15/065; G10L 15/07; G10L 15/063; G10L 15/22; G10L 2015/221; G10L 15/26; G10L 15/265; G10L 15/32; G10L 17/12; G10L 17/14; G10L 17/26; G10L 25/00; G10L 25/51; G10L 25/05
See application file for complete search history.

(56) References Cited

U.S. PATENT DOCUMENTS 5,987,415 A * 11/1999 Breese .................... G10L 17/26
                                                           704/270
5,995,924 A    11/1999 Terry (Continued)

OTHER PUBLICATIONS

"International Search Report & Written Opinion for PCT Patent Application No. PCT/US2014/020444", Mailed Date: Jun. 6, 2014, Filed Date: Mar. 5, 2014, 10 Pages.

(Continued)

*Primary Examiner* — Richard Zhu
(74) *Attorney, Agent, or Firm* — Dave Ream; Tom Wong; Micky Minhas (57) ABSTRACT

Systems and methods for responding to an audio query are presented. More particularly, vocalization nuances of a vocalized search query (audio query) are identified are utilized in responding to the audio query. In addition to converting the audio query to a textual representation, vocalization nuances of the audio query are identified. Search results are identified according to the textual representation of the audio query and in light of the vocalization nuances. A search results presentation is prepared in response to the audio query, where the search results presentation is based on the identified search results and also based on the vocalization nuances. The search results presentation is returned in response to the audio query.

15 Claims, 6 Drawing Sheets

(51) Int. Cl.
  *G10L 25/75* (2013.01)
  *G10L 17/26* (2013.01)
  *G06Q 30/02* (2012.01)
  *G10L 25/00* (2013.01)
  *G10L 15/32* (2013.01)

(56) References Cited

U.S. PATENT DOCUMENTS

| | | |
|---|---|---|
| 6,638,217 B1 | 10/2003 | Liberman |
| 6,721,706 B1 | 4/2004 | Strubbe et al. |
| 6,873,953 B1 | 3/2005 | Lennig |
| 7,349,527 B2 * | 3/2008 | Yacoub et al. ............ 379/88.11 |
| 7,657,433 B1 * | 2/2010 | Chang ........................ 704/252 |
| 7,716,056 B2 | 5/2010 | Weng et al. |
| 7,881,933 B2 * | 2/2011 | Witzman ..................... 704/250 |
| 8,000,962 B2 * | 8/2011 | Doyle et al. ................. 704/240 |
| 8,073,681 B2 | 12/2011 | Baldwin et al. |
| 8,078,470 B2 | 12/2011 | Levanon et al. |
| 8,260,809 B2 | 9/2012 | Platt et al. |
| 8,626,588 B2 * | 1/2014 | Rajaram ............ G06Q 30/0275 705/14.69 |
| 8,793,127 B2 * | 7/2014 | Printz et al. .................. 704/232 |
| 8,848,882 B2 * | 9/2014 | Mukherjee .......... H04M 3/2281 379/88.18 |
| 8,856,007 B1 * | 10/2014 | Stuttle et al. ................. 704/260 |
| 2005/0125225 A1 * | 6/2005 | Manu et al. .................. 704/237 |
| 2007/0005570 A1 | 1/2007 | Hurst-Hiller et al. |
| 2007/0078708 A1 * | 4/2007 | Yu ........................ G06Q 30/02 705/14.69 |
| 2007/0127688 A1 | 6/2007 | Doulton |
| 2007/0164782 A1 * | 7/2007 | Church et al. ................ 326/41 |
| 2008/0031475 A1 * | 2/2008 | Goldstein .................... 381/151 |
| 2010/0036660 A1 | 2/2010 | Bennett |
| 2010/0169091 A1 * | 7/2010 | Zurek et al. ................. 704/235 |
| 2010/0241963 A1 * | 9/2010 | Kulis et al. .................. 715/727 |
| 2011/0238485 A1 * | 9/2011 | Haumont et al. .......... 705/14.41 |
| 2012/0059656 A1 * | 3/2012 | Garland et al. ............... 704/254 |
| 2013/0013308 A1 | 1/2013 | Cao et al. |

OTHER PUBLICATIONS

Cowie, et al., "Emotion Recognition in Human-Computer Interaction", In IEEE Signal Processing Magazine, vol. 18, Issue 1, Jan. 2001, pp. 32-80.

Choi, et al., "SCAN—Speech Content Based Audio Navigator: A Systems Overview", Retrieved at <<http://singhal.info/icslp98.pdf>>, In Proceedings of the 7th Australian International Speech Science and Technology Conference, Nov. 1998, pp. 4.

"International Preliminary Report on Patentability Issued in PCT Patent Application No. PCT/US2014/020444", Mailed Date: Jun. 10, 2015, 6 Pages.

* cited by examiner

SEARCH RESULTS USING INTONATION NUANCES

BACKGROUND

Search engines have become a common, often-used source for obtaining information on a variety of subjects and/or topics. Further, while people often use desktop or laptop computers to interact with the search engine, more and more frequently a person will interact with the search engine by way of a mobile device. When interacting with the search engine by way of a mobile device, it is becoming ever more common for a person to interact with the search engine by way of voice input.

Many search engines, today, make great efforts to provide high quality search results and/or advertisements that are specifically tailored to the computer user. The purpose of this is to improve the computer user's overall experience with the search engine in order to ensure that the computer user returns to the search engine and not to another, competing search service.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Many voice-to-text conversion systems provide accurate results. However, voice communication includes numerous vocalization nuances that person-to-person communication can convey but are not currently captured in voice to text conversion. These vocalization nuances convey messages or attributes about the person speaking. These "vocalization nuances" include attributes regarding: gender, age, mood, emotion, urgency, question, ethnicity, nationality, country or region of origin, social class, and the like.

According to aspects of the disclosed subject matter, a computer-implemented method for responding to an audio query is presented. More particularly, in response to receiving a vocalized search query (i.e., audio query), the audio query is converted to a textual representation. In addition to converting the audio query, vocalization nuances of the audio query are identified. Search results are identified according to the textual representation of the audio query and in light of the vocalization nuances. A search results presentation is prepared in response to the audio query, where the search results presentation is based on the identified search results and also based on the vocalization nuances. The search results presentation is returned in response to the audio query.

According to additional aspects of the disclosed subject matter, computer-readable media bearing computer executable instructions which, when executed by a processor, carry out a method for responding to an audio query, are presented. In executing the computer executable instructions and in response to receiving a vocalized search query (i.e., audio query), the audio query is converted to a textual representation. In addition to converting the audio query, vocalization nuances of the audio query are obtained. Search results are identified according to the textual representation of the audio query and in light of the vocalization nuances. A search results presentation is prepared in response to the audio query, where the search results presentation is based on the identified search results and also based on the vocalization nuances. The search results presentation is returned in response to the audio query.

According to still further aspects of the disclosed subject matter, a computer system for responding to an audio query is presented. The computer system includes a processor and a memory, where the processor executes instructions stored in the memory as part of or in conjunction with additional components to respond to an audio query received from a computer user. The additional components include a network communication component configured to enable communications over a network. The additional components also include an audio-text converter, a vocalization detector, a search results identification component, and a search results presentation generator. The audio-text converter is configured to convert an audio query to a textual representation of the audio query. The vocalization detector is configured to identify vocalization nuances of the audio query. The search results identification component identifies search results is response to receiving the audio query from a content data store and in light of the vocalization nuances of the audio query. The search results presentation generator generates a search results presentation for the requesting computer user based on the identified plurality of search results and in light of the vocalization nuances of the audio query.

Additional aspects of the disclosed subject matter include a computer-implemented service for providing a textual representation of an audio file. The service, being implemented on a computer system comprising a processor, a memory, and network communication component, is configured to receive an audio file for translation from an external requesting party over the network communication component. In response to receiving the audio file, the service provides a textual translation of the audio file, a set of vocalization nuances identified from the audio file, and a set of confidence/risk value pairs corresponding to the set of vocalization nuances.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposed of clarity, the use of the term "exemplary" in this document should be interpreted as serving as an illustration or example of something, and it should not be interpreted as an ideal and/or a leading illustration of that thing. An "API" is short for an application programming interface, i.e., a protocol intended to be used as an interface to communicate with external devices and/or software components. An "audio query" should be interpreted as vocalized search query captured in an audio file. An "audio file" should be interpreted to include both documents/files comprising recorded audio data, i.e., vocalized speech, as well as streaming audio data.

A vocalization nuance corresponds to an aspect of vocalization of speech that is reflective upon the person/entity that vocalized the speech. A vocalization nuance relates aspects of a person's speech (or speech patterns) and may reflect any one of, by way of illustration and not limitation: gender, age, mood, emotion, urgency, question, ethnicity, nationality, country or region of origin, social class, and the like. By way of illustration, vocalization nuances may be based on intonations, emphasis, word and phrase use, pace, and the like.

Vocalization nuances of a vocalized search query can be used to improve search results in response to the query. In addition to assisting the search engine in identifying more relevant search results after the audio query is translated to a textual representation, the vocalization nuances may be used to modify the textual translation before search results are identified. Of course, the nuances may also be used after translation to filter and/or boost search results identified in response to the search query. Further still, the vocalization nuances may be used enhance the presentation of search results for the user. To more fully appreciate these aspects of the disclosed subject matter, reference is now made to the figures.

Figure 1:
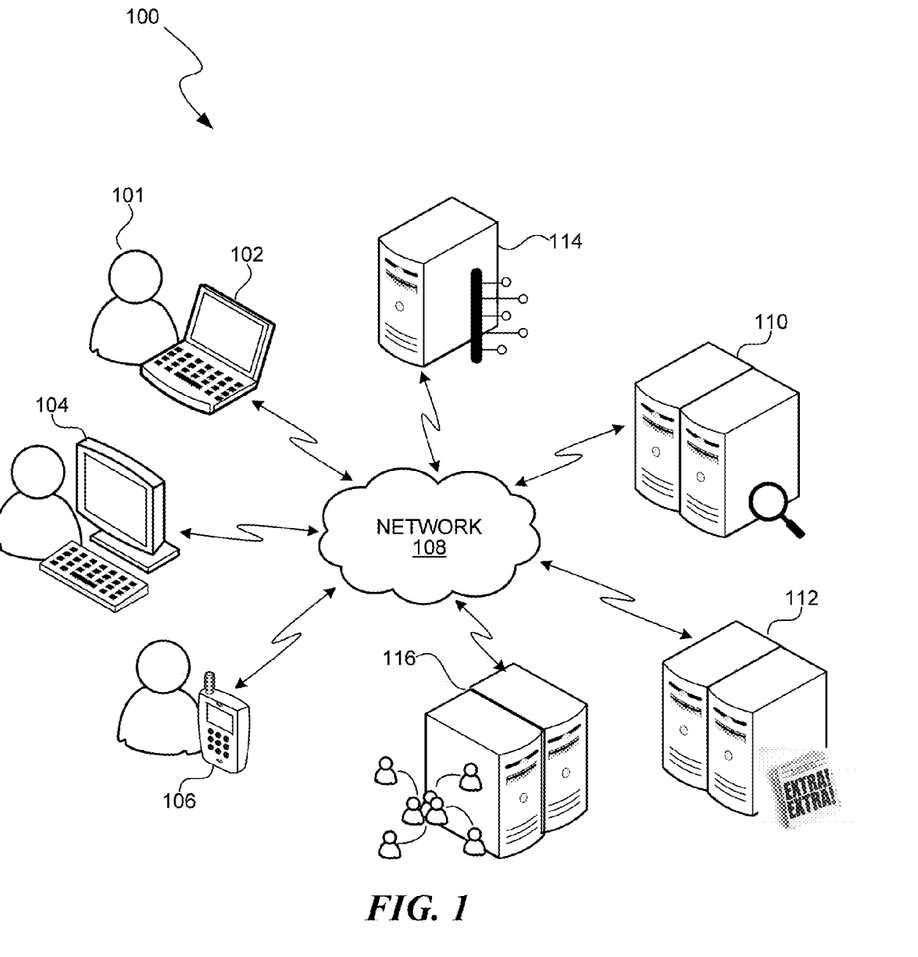
FIG. 1 is block diagram illustrating an exemplary networked environment suitable for implementing aspects of the disclosed subject matter.

Turning to FIG. 1, FIG. 1 is a block diagram illustrating an exemplary networked environment 100 suitable for implementing aspects of the disclosed subject matter, particularly in regard to responding to an audio query from a computer user. The illustrative networked environment 100 includes one or more user computers, such as user computers 102-106, connected to a network 108, such as the Internet, a wide area network or WAN, and the like. For purposes of this disclosure, a user computer is a computer or computing device that belongs to or is accessible for use by a computer user. Also connected to the network 108 is a search engine 110 configured to provide search results in response to audio queries received from one or more persons/computer users, such as computer user 101 by way of user computer 102 over the network 108. In addition to providing search results in response to search queries, and particularly to audio queries, the search engine 110 is configured to generate a presentation of the search results that is updated, in part, according to vocalization nuances of the audio query.

Those skilled in the art will appreciate that, generally speaking, a search engine 110 corresponds to an online service hosted on one or more computers, or computing systems, located and/or distributed throughout the network 108. The search engine 110 receives and responds to search queries submitted over the network 108 from various computer users, such as computer user 101 using user computer 102 over the network 108. In particular, in response to receiving a search query/audio query from a computer user, the search engine 110 obtains search results information related and/or relevant to the received search query as defined by the terms of search query as well as one or more vocalization nuances identified in the audio query. The search results information typically includes search results, i.e., references (typically in the form of hyperlinks) to relevant and/or related content available at various network locations located throughout the network 108, such content sites 112-116. Other information may also be included in the search results information, such as advertisements, social information, and the like. Content sites may include (by way of illustration and not limitation): news outlets/portals/sources, such as news content site 112; online shopping sites (not shown); service sites, such as audio-to-text translation site 114; social media and networking sites, such as social site 116; educational and research sites (not shown); and the like.

According to aspects of the disclosed subject matter and as will be described in greater detail below, in response to receiving an audio query, one or more vocalization nuances of the audio query are identified in addition to translating the audio query to a textual representation. The one or more vocalization nuances may be used to update the textual representation, including clarifying ambiguities, correcting spelling errors, and the like, of one or more query terms. Search results are identified based on the textual representation and also may be identified according to the one or more vocalization nuances. A search results presentation is prepared based on the identified search results. Additional information may be included in the search results presentation which is identified according to the one or more vocalization nuances.

Figure 2:
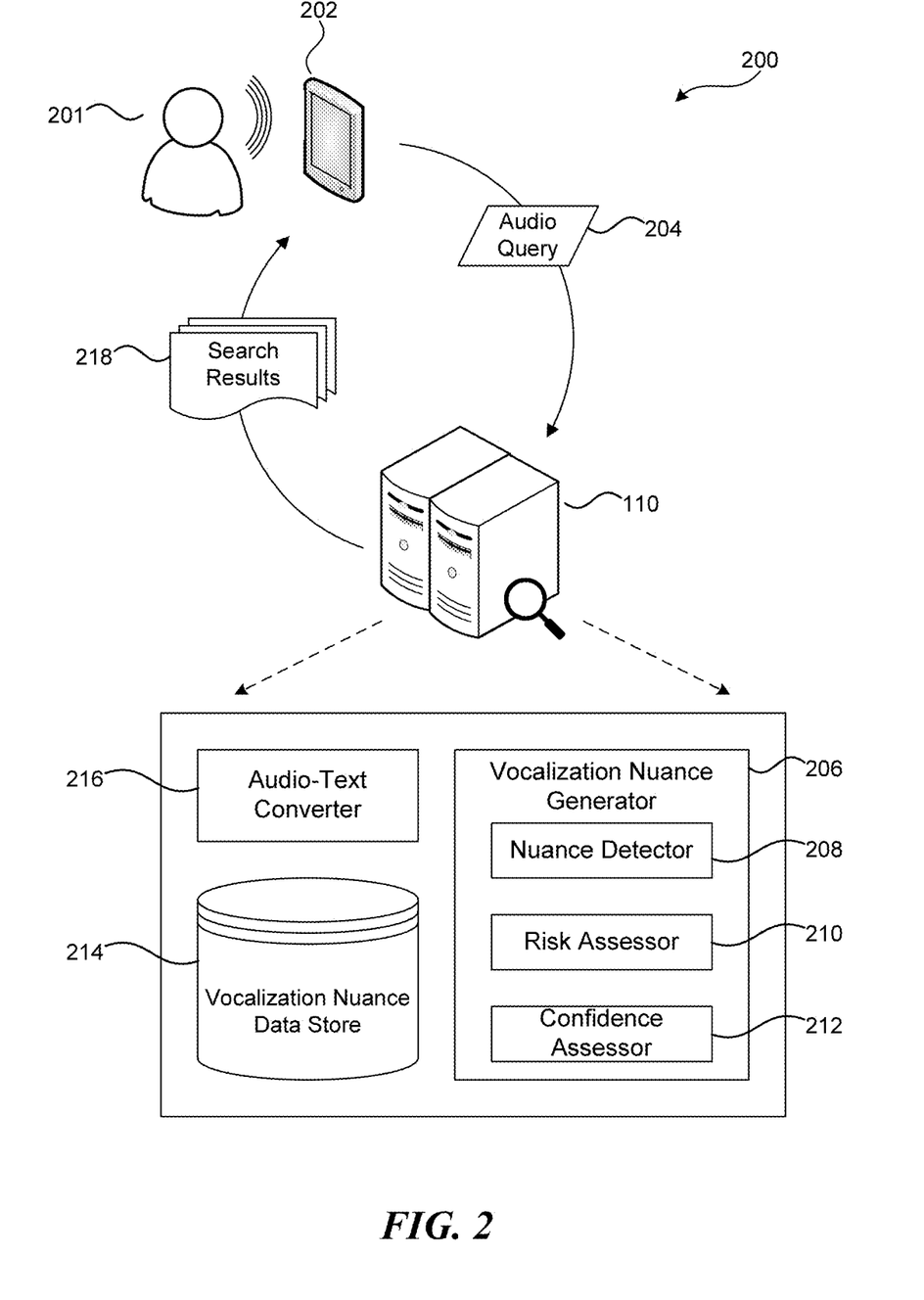
FIG. 2 is a block diagram illustrating the interaction between a computer user on a computing device and a search engine in processing a voice query.

FIG. 2 is a block diagram 200 illustrating the interaction between a computer user 201 on a computing device 202 and a search engine 110 in processing a voice query. The process begins with the computer user 201 vocalizing a search query to the computer user's computing device 202. The computing device 202 captures the vocalized search query and converts the vocalized search query to an audio file, or more specifically, an audio query 204. Those skilled in the art will appreciate that, in many embodiments, the computing device 204 captures and converts the vocalized search query by way of a digital signal processor (DSP) or coder/decoder (CODEC) on the device, though other systems and/or components may be used. Irrespective of the means in which the vocalized search query is captured, the audio query 204 is then submitted to the search engine 110.

Typically included with the submission of the audio query 204 to the search engine 110 (as well other forms of search queries) is user-related data that the search engine may use to identify relevant search results. As one non-limiting example, the user-related data (not shown) may include computer user identification information that can be used to identify the particular computer user 201 to the search engine 110. According to embodiments of the disclosed subject matter, the search engine 110 maintains a user profile data store with entries corresponding to individual computer users. These entries typically include user preferences (both implicit and/or explicit) that can be used to provide more relevant results to the computer user 201, as well as providing a basis for making use of vocalization nuances that may be determined from the audio query 204. User-related data may also include current contextual data, such as the current geographic location of the computer user 201, the type of computing device 202 that the computer user is interacting with, and the like. As will be appreciated from the description below, the geo-spatial location of the computer-user 201 may be useful in determining vocalization nuances and how they are utilized.

FIG. 2 illustrates various components that may be included in a suitably configured search engine 110, including a speech translator component 216. Upon receiving the audio query 204, the search engine translates the audio query to a textual representation by way of the speech translator component 216. In addition to translating the audio query 204, the search engine obtains various vocalization signals from a vocalization signal generator 206. According to aspects of the disclosed subject matter, the vocalization signal generator 206 includes a vocalization detector 208 that detects one or more vocalization nuances from the audio query 204. The vocalization signal generator 206 also includes a risk assessor 210 and a confidence assessor 212 which are used to generate confidence/risk assessment value pairs for the vocalization nuances generated by the vocalization detector 208. The vocalization nuances as well as the corresponding confidence/risk value pairs are used by the search engine 110 to potentially clarify or improve the textual representation of the audio query 204, identify search results corresponding to the audio query that are more relevant to the computer user 201, as well as generate a search results presentation 218 that is more tailored/relevant to the computer user.

After identifying search results, the search engine 110 generates a search results presentation 218 to be provided/returned to the computer user 201 in response to the audio query 204. The search results presentation 218 is generated based, at least in part, according to the identified search results corresponding to the search query. In addition to the search results that satisfy the audio query, i.e., search results that correspond and are relevant to the subject matter of the audio query, other information may be included such advertisements, social-related information, and the like. This "other information" may be selected and/or tailored according to one or more vocalization nuances. The search results presentation may be organized into one or more search results pages, as an audio response to the audio query, or any suitable response given the subject matter as well as the type of computing device to which the search results presentation 218 is to be returned.

To more fully illustrate the process described above, some examples are now presented. For purposes of a first example, assume that the computer user 201 vocalizes the query "TV show The Office." Additionally, let us assume that the computer user 201 is a British native/citizen with a British accent but is currently located within the United States. The computer user's computing device captures the vocalized query, the result being the audio query 204. At the computer user's direction, audio query 204, along with user-related data, is submitted to the search engine 110. The search engine 110, by way of the speech translator 216, translates the audio query 204 a textual representation, i.e., "TV show the office." If the search engine 110 were to analyze the textual representation of the audio query 204, it would recognize an ambiguity in the query: there are at least two TV shows and type called "The Office," one in the United States and one in England. Without more, the search engine 110 would likely select the TV show presented in the United States as the subject matter of the audio query. However, by way of the vocalization detector 208, the search engine obtains vocalization nuances from the audio query 204. As previously indicated, these vocalization nuances may reflect, by way of illustration and not limitation: gender, age, mood, emotion, urgency, ethnicity, nationality, country or region of origin, social class, and the like. Assuming then, that the vocalization detector 208 detects that the computer user's nationality is British and makes this vocalization nuance available to the search engine 110 for consideration, the search engine may well determine that the computer user's intent of the audio query is the British version of "The Office." Based on this determination, the search engine 110 identifies relevant results, prepares a search results presentation 218, and returns the search results presentation to the computer user 201 by way of the computer users computing device 202.

By way of a second example, assume that this same computer user 201 (a British national located somewhere in the United States) vocalizes the query, "sulfur dioxide." As above, the computer user's computing device 202 captures the vocalized query with the result being an audio query 204. At the computer user's command, the audio query 204 is submitted to the search engine 110. The search engine 110, by way of the speech translator 216, translates the audio query 204 to a textual representation, i.e., "sulfur dioxide." In addition to the translation, the vocalization detector 208 identifies one or more vocalization nuances from the audio query 204. In this case, prior to identifying search results corresponding to the search query and based on an vocalization nuance that indicates that the computer user is a British national, the search engine updates the textual representation of the audio query 204 to a British spelling, "sulphur dioxide." Of course, given the subject matter of the audio query, it is unclear whether the search results that may be identified by the search engine 110 would be different simply because of the updated spelling. However, after identifying search results corresponding to the subject matter of the audio query 204, the search engine prepares a search results presentation 218 to be returned to the computer user 201. As part of preparing the search results presentation 218, the search engine 110 considers vocalization nuance that the computer user 201 is a British national as well as user related data discussed above, such as the fact that the computer user is located currently in the United States. In this preparation, and advertisement that is directed to British nationals, such as inexpensive air travel across the Atlantic, may be selected based on both the vocalization nuance (British national) and the user related data (located in the United States). The search results presentation 218 is then returned to the computer user 201 by way of the computer user's computing device 202.

It should be appreciated that one of the goals of a search engine 110 is to provide a search results presentation 218 of high quality such that the computer user 201 will return again to use the services of the search engine. Using vocalization nuances as signals in identifying relevant search results has the potential to improve the relevancy and focus of the results provided to the computer user (as indicated in the examples above), but also has the potential to be very wrong to the point of being offensive. Accordingly, in addition to identifying vocalization nuances, the search engine also obtains confidence/risk value pairs corresponding to the identified vocalization nuances. For its part, the confidence value corresponds to a level of confidence that the identified vocalization nuance is correct. With reference to the prior two examples, assuming that vocalization nuance indicates that the computer user 201 is a British national, a confidence value indicates the confidence vocalization nuance is correct, i.e., that the computer user is a British national. According to one embodiment, the confidence value can range from 0-1, where a confidence value of "0" would correspond to the least confidence that the vocalization nuance is correct, and a confidence value of "1" would correspond to the highest level of confidence that the vocalization nuance is correct. Of course, any range of values may be used (e.g., 1-100, −1-+1, and the like). The discrete range of numbers or ordinal values, such as (by way of illustration and not limitation) "low," "medium," "high," may also be used. In this sense, the confidence is a weighting value of the vocalization nuance to the search engine 110, indicating how much weight the search engine should give the particular vocalization nuance.

In addition to the confidence value, a risk value is also provided for a vocalization nuance. The risk value represents the risk of providing offensive content to the computer user 201 in search results selected based, in part, on the identified vocalization nuance. Stated differently, the risk value represents the risk that the search results presentation 218 could be offensive to the computer user 201 if the search engine 110 relies upon the corresponding vocalization nuance. Indeed, search results based on a vocalization nuance directed to age, gender, nationality, religious affiliation, cultural differences, as well as many other vocalization nuances can be highly offensive if the wrong vocalization nuance is promoted by the search engine in the search results presentation 218. Similarly, search results that have been personalized to a particular computer user, such as computer user 201, to too great of a degree based on correctly identified vocalization nuances may also be offensive. The risk value can be used to apply personalization in a lighter, less intrusive manner. Hence, the risk value corresponding to an vocalization nuance represents the risk of providing offensive content to the computer user 201 based on the vocalization nuance irrespective of whether the vocalization nuance accurately reflects some attribute of the computer user. According to various embodiments, risk values are determined according to predetermined values associated with one or more vocalization nuances such that when a particular vocalization nuance is identified, the risk value associated with the vocalization nuance can be looked up.

As with the confidence value, the risk value may be represented by range of values, such as a range of values between 0 and 1, or by discrete ranges, and the like. The search engine 110 uses the risk value and the confidence value in determining a weight, if any, that the search engine 110 will give to a corresponding vocalization nuance. Information regarding the risk of a vocalization nuance being incorrect would typically be stored in a vocalization nuance data store 214. Moreover, information and/or data for identifying vocalization nuances as well as determining a confidence value for an vocalization nuance is typically stored in the vocalization nuance data store 214.

According to embodiments of the disclosed subject matter, as vocalization nuances detect various personal characteristics of the computer user (such as gender, nationality, age, and the like) a suitably configured search engine 110 will provide the computer user with the ability to control what information is and is not detected or used in obtaining search results. In various embodiments, the search engine 110 implements an "opt-in" strategy such that vocalization nuances are not detected and/or used unless the computer user "opts into" the use of the features. Moreover, in various embodiments the computer user is provided with the ability to specify which vocalization nuances would be acceptable to be detected and used.

While the discussion above has been made with regard to a confidence/risk value pair, in alternative embodiments the confidence value and risk value may be used independently of each other. For example, a confidence value may be used in identifying (or boosting) relevant search results without regard to a risk of including offensive material, especially if a subsequent but unrelated filter is applied. Similarly, a risk value may be used without consideration to the confidence of the vocalization nuance detection, especially in circumstances where avoiding the use of offensive content is paramount.

Figure 3:
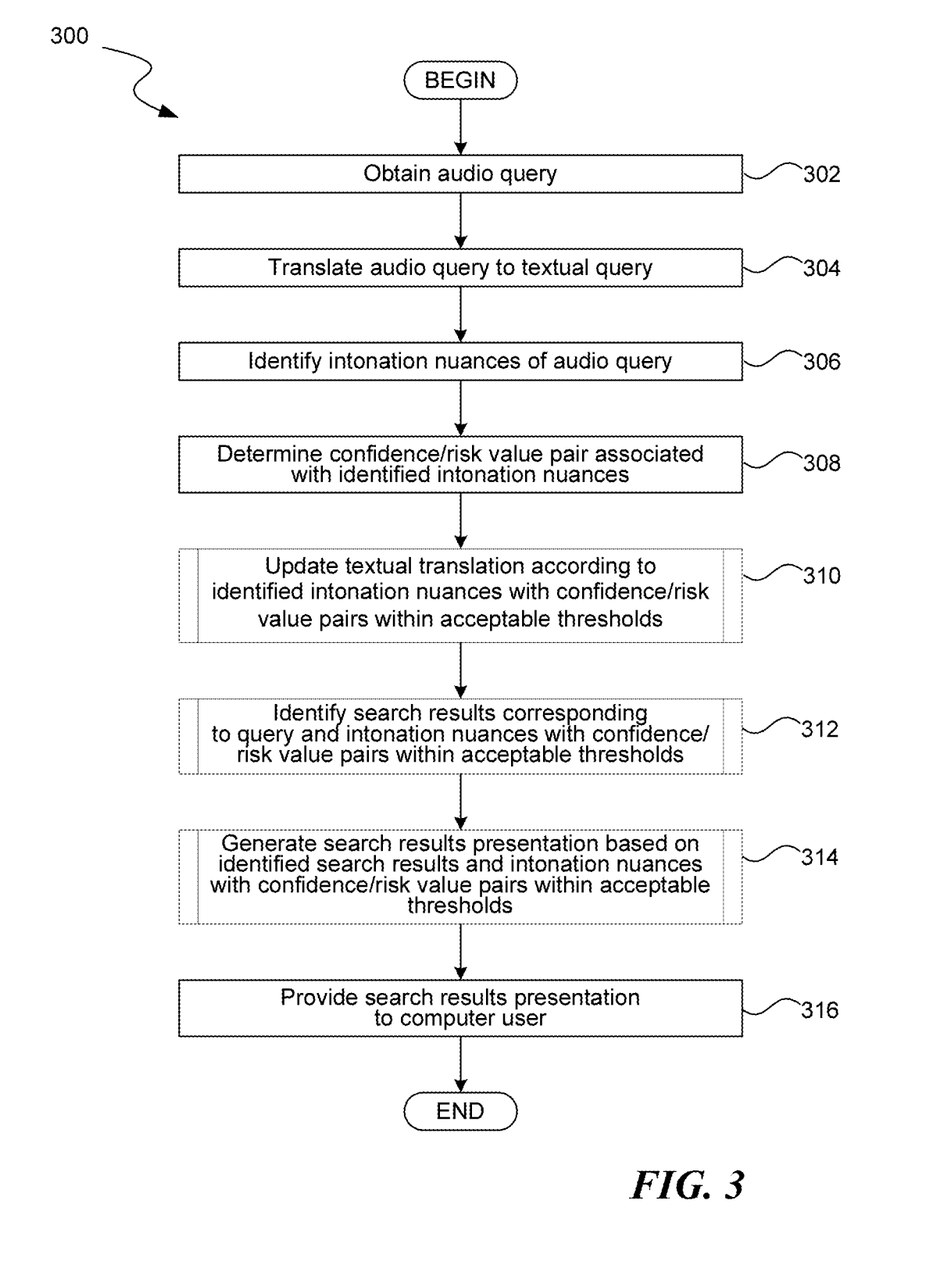
FIG. 3 is a flow diagram illustrating an exemplary routine for responding to an audio search query according to aspects of the disclosed subject matter.

Turning now to FIG. 3, FIG. 3 is a flow diagram illustrating an exemplary routine 300 for responding to an audio search query according to aspects of the disclosed subject matter. Beginning at block 302, an audio query 204 is obtained. At block 304, the audio query is converted to a texture representation, i.e., a textual query. At block 306, vocalization nuances corresponding to the audio query 204 are identified. At block 308, confidence/risk value pairs corresponding to the identified vocalization nuances are determined.

At block 310, the textual representation of the audio query may be updated according to the identified vocalization nuances whose corresponding confidence/risk value pairs fall within acceptable, predetermined thresholds. It should be appreciated that not all vocalization nuances will cause an update to the textual representation of the audio query 204 even when the confidence/risk value pairs fall within acceptable thresholds. Updating the textual representation is made individually in light of a vocalization nuance and the text. At block 312, similar to the prior step, search results are identified corresponding to the textual representation of the audio query and in light of the vocalization nuances whose corresponding confidence/risk value pairs fall within acceptable, predetermined thresholds. At block 314, a search results presentation 218 is generated based on the identified search results of block 312 and in light of vocalization nuances whose corresponding confidence/risk value pairs fall within acceptable, predetermined thresholds. All of the threshold values determined and/or identified according to implementation details depending on the balance of confidence and risk that a search engine implementer is willing to accept. At block 316, search results presentation is then provided to the requesting computer user in response to the audio query 204. Thereafter, the routine 300 terminates.

Figure 4:
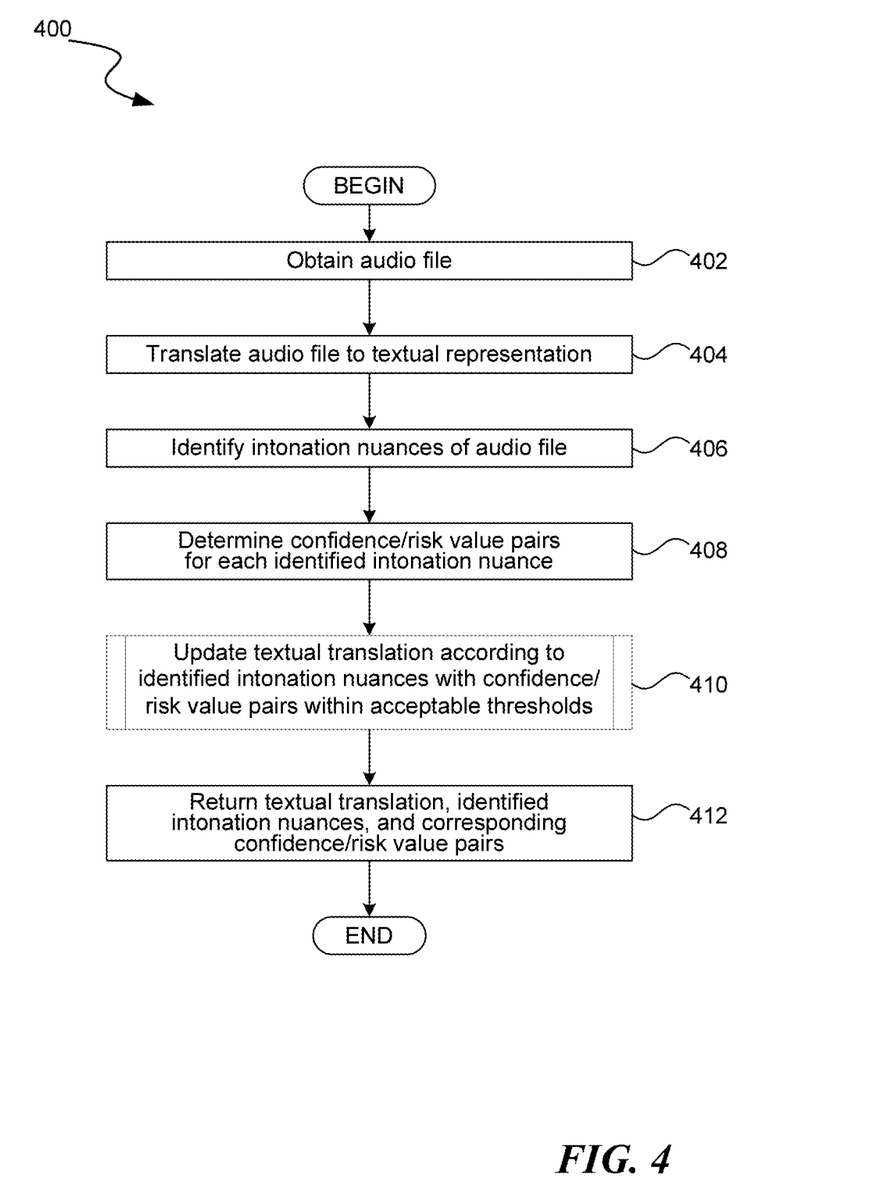
FIG. 4 is a flow diagram illustrating an exemplary routine for providing a audio-to-text translation of an audio file as well as nuances of the audio file with corresponding confidence/risk values.

While a search engine 110 may be configured with components such as the audio-text converter 216 and the vocalization signal generator 206, in an alternative embodiment (described below in regard to FIG. 6) a search engine may simply include a component that interfaces with a particular audio-to-text service to obtain a textual representation of an audio query 204 as well as vocalization nuances and corresponding confidence/risk value pairs. Further still, a search engine 110 may be configured to provide audio-to-text services. FIG. 4 is a flow diagram illustrating an exemplary routine 400 for providing an audio-to-text conversion of an audio file as well as vocalization nuances of the audio file with corresponding confidence/risk values, according to aspects of the disclosed subject matter.

Beginning at block 402, exemplary routine 400 obtains an audio file (such as an audio query 204) to be converted. At block 404, the audio file is converted, i.e., a textual representation of the audio file is generated. At block 406, vocalization nuances of the audio file are identified. Block 408, confidence/risk value pairs for each identified vocalization nuance is determined. At control block 410, the textual representation of the audio file is updated according to vocalization nuances with confidence/risk value pairs falling within acceptable, predetermined thresholds. At block 412, the textual representation (potentially updated according to one or more vocalization nuances), the identified vocalization nuances, and corresponding confidence/risk value pairs are returned in response to the calling of this exemplary routine 400. Thereafter, the routine 400 terminates.

Regarding routines 300 and 400, while these routines are expressed in regard to discrete steps, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 300 and 400 may be carried out in parallel or in series. Often, but not exclusively, the functionality of the various routines is embodied in software (e.g., applications, system services, libraries, and the like) that is executed on computer hardware and/or systems as described below in regard to FIGS. 5 and 6. In various embodiments, all or some of the various routines may also be embodied in hardware modules on a computer system.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When executed on a computing device, the computer-executable instructions stored on one or more computer-readable storage devices carry out various steps, methods and/or functionality, including those steps, methods, and routines described above in regard to routines 300 and 400. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 5:
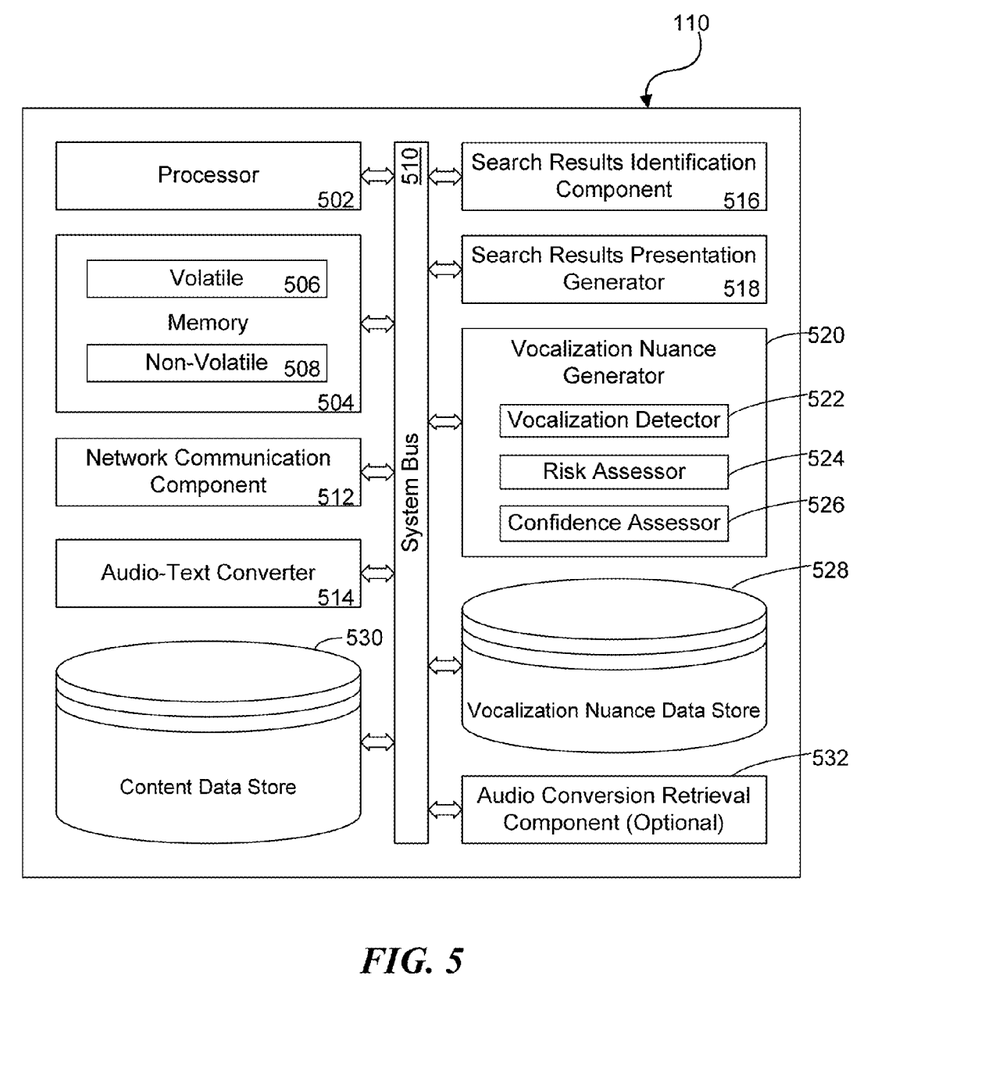
FIG. 5 is a block diagram illustrating an exemplary search engine configured according to one embodiment of the disclosed subject matter.

Turning now to FIG. 5, this figure is a block diagram illustrating an exemplary search engine 110 configured according to one embodiment of the disclosed subject matter. As shown in FIG. 5, the search engine 110 includes a processor 502 (or processing unit) and a memory 504 interconnected by way of a system bus 510. As those skilled in the art will appreciated, memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory whereas ROM and memory cards are examples of non-volatile memory.

The processor 502 executes instructions retrieved from the memory 504 in carrying out various functions, particularly in regard to converting an audio query 204 to a corresponding textual representation, in identifying vocalization nuances corresponding to the audio query, obtaining search results corresponding to the audio query and in light of the vocalization nuances, and preparing a search results presentation 218 in light of the vocalization nuances. The processor 502 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); handheld computing devices such as smartphones, personal digital assistants, and the like; microprocessor-based or programmable consumer electronics; and the like.

The system bus 510 provides an interface for search engine's components to inter-communicate. The system bus 510 can be of any of several types of bus structures that can interconnect the various components (including both internal and external components). The search engine 110 further includes a network communication component 512 for interconnecting the search engine with other computers (including, but not limited to, user computers such as user computers 102-106 and 202) as well as other devices or services on a computer network 108. The network communication component 512 may be configured to communicate with an external network, such as network 108, via a wired connection, a wireless connection, or both.

As indicated above, the search engine 110 includes an audio-text converter 514 to transfer and audio query 204 to its textual representation. Further still, the search engine 110 includes a vocalization nuance generator 520 that includes a vocalization detector 522, a risk assessor 524, and the confidence assessor 526. As discussed above, the vocalization detector 522 identifies one or more vocalization nuances corresponding to an audio query 204. The confidence assessor 526 identifies a value indicative of the confidence that a corresponding vocalization nuance is correct. Similarly, the risk assessor 524 identifies a value indicative of the risk that a corresponding vocalization nuance result in offensive subject matter being presented to a computer user, such as computer user 201. The risk assessor 524, the confidence assessor 526, and the vocalization detector 522, rely upon data that is stored in a vocalization nuance data store 528.

The search engine 110 further includes a search results identification component 516 that is able to identify search results corresponding to the subject matter of an audio query (as represented by the textual representation of the audio query) from the content data store 530. The search results are identified in light of the vocalization nuances of the audio query 204, particularly those vocalization nuances that fall within acceptable, predetermined thresholds as determined by the confidence/risk value pairs. The search engine 110 also includes a search results presentation generator 518 that generates a search results presentation 218 based on identified search results from the search results identification component 516 and in light of the identified vocalization nuances. As with the search results identification component 516, the search results presentation generator 518 generates the search results presentation in light of the identified vocalization nuances that fall within acceptable, predetermined thresholds as determined by the corresponding confidence/risk value pairs.

As suggested above, a search engine 110 may alternatively be configured such that vocalization nuances, audio-to-text conversions, and confidence/risk value pairs can be obtained from an external service. In this alternative embodiment, the search engine 110 would include an audio conversion retrieval component 532 configured to obtain a textual representation of an audio query 204, one or more vocalization nuances associated with the audio query, and corresponding confidence/risk value pairs. The audio conversion retrieval component 532 obtains these items from an external service by way of the network communication component 512. Of course, where the search engine 110 is configured with an audio conversion retrieval component 532, elements/components such as the vocalization nuance generator 520, the vocalization nuance data store 528, and the audio-text converter 514 would likely omitted from the search engine.

Figure 6:
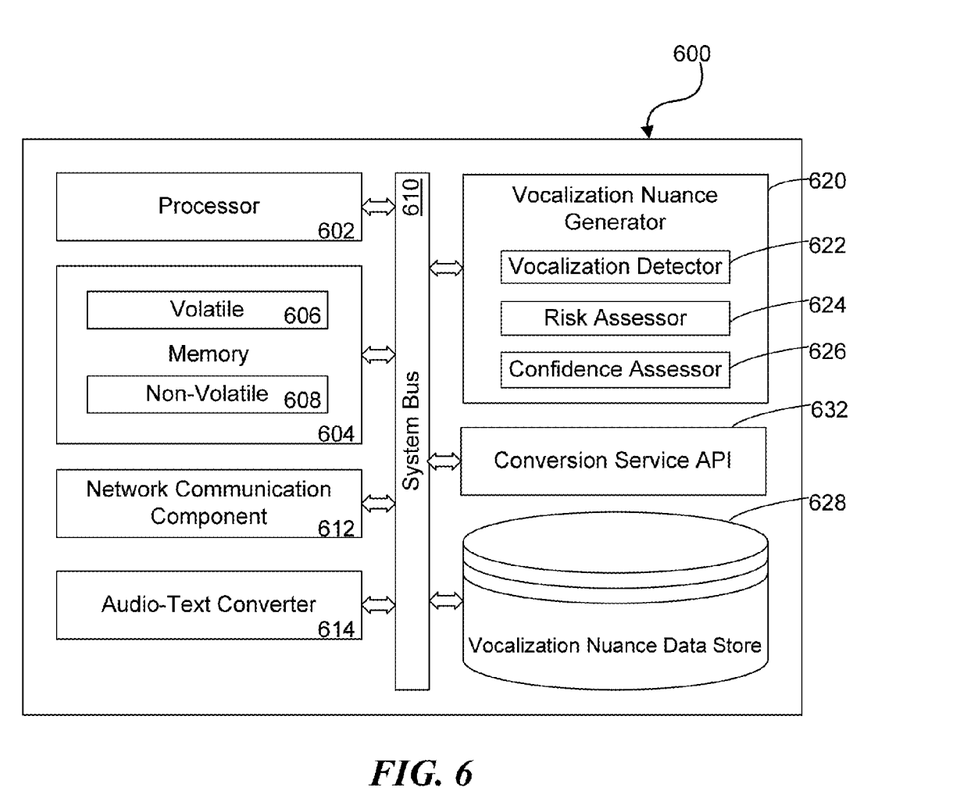
FIG. 6 is a block diagram illustrating an audio-text translation service configured according to an embodiment of the disclosed subject matter.

In regard to an external service that provides a textual conversion/representation of an audio file as well as information detected from vocalization nuances with corresponding confidence/risk value pairs, FIG. 6 is a block diagram illustrating an audio-text conversion service 600 configured according to an embodiment of the disclosed subject matter. As with the search engine 110 of FIG. 5, the audio-text conversion service 600 includes a processor 602 (or processing unit) and a memory 604 interconnected by way of a system bus 610. As suggested above, memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory whereas ROM and memory cards are examples of non-volatile memory.

The processor 602 executes instructions retrieved from the memory 604 in carrying out various functions, particularly in regard to converting an audio file to a corresponding textual representation, identifying vocalization nuances of the audio file as well as confidence less risk value pairs corresponding to the vocalization nuances. As suggested above, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); hand-held computing devices such as smartphones, personal digital assistants, and the like; microprocessor-based or programmable consumer electronics; and the like.

The system bus 610 provides an interface for search engine's components to inter-communicate. The system bus 610 can be of any of several types of bus structures that can interconnect the various components (including both internal and external components). The audio-text conversion service 600 further includes a network communication component 612 for interconnecting the search engine with other computers (including, but not limited to, search engine 110 and user computers such as user computers 102-106 and 202) as well as other devices or services on a computer network 108. The network communication component 612 may be configured to communicate with an external network, such as network 108, via a wired connection, a wireless connection, or both.

The audio-text conversion service 600 includes an audio-text converter 614 to transfer and audio file to a corresponding textual representation. Further still, the audio-text conversion service 600 includes a vocalization nuance generator 620 that includes a vocalization detector 622, a risk assessor 624, and the confidence assessor 626. As discussed above, the vocalization detector 622 identifies one or more vocalization nuances corresponding to an audio file, such as an audio query 204. The confidence assessor 626 identifies a value indicative of the confidence that a corresponding vocalization nuance is correct. Similarly, the risk assessor 624 identifies a value indicative of the risk that a corresponding vocalization nuance result in offensive subject matter being presented to a computer user, such as computer user 201. The risk assessor 624, the confidence assessor 626, and the vocalization detector 622, rely upon data that is stored in a vocalization nuance data store 628.

Further included in or provided by the audio-text conversion service 600 is a conversion service API 632. The conversion service API 632 provides the interface by which other computers, such as the search engine 110 can interface with the audio-text conversion service 600 over a network 108.

Those skilled in the art will appreciate that the various components of FIGS. 5 and 6 described above may be implemented as executable software modules within the computer systems, as hardware modules, or a combination of the two. Moreover, each of the various components may be implemented as an independent, cooperative process or device, operating in conjunction with one or more computer systems. It should be further appreciated, of course, that the various components described above in regard to the search engine 110 and audio-text conversion service 600 should be viewed as logical components for carrying out the various described functions. As those skilled in the art appreciate, logical components (or subsystems) may or may not correspond directly, in a one-to-one manner, to actual, discrete components. In an actual embodiment, the various components of each computer system may be combined together or broke up across multiple actual components and/or implemented as cooperative processes on a computer network 108.

While various novel aspects of the disclosed subject matter have been described, it should be appreciated that these aspects are exemplary and should not be construed as limiting. Variations and alterations to the various aspects may be made without departing from the scope of the disclosed subject matter. In an alternative embodiment, a text messaging service that provides audio input for a user may rely upon the services of the audio-text conversion service 600 to improve the quality of the audio-to-text translation. Indeed, many services that provide for audio input may be benefited through aspects of the disclosed subject matter.

What is claimed:

1. A computer implemented method for responding to an audio query from a computer user, the method comprising:
   receiving an audio query from a computer user;
   translating the audio query to a textual representation;
   identifying a vocalization nuance corresponding to the computer user from the audio query;
   determining a confidence value associated with the identified vocalization nuance, the confidence value indicating a confidence score that the identified vocalization nuance correctly reflects the corresponding aspect of the computer user;
   determining a risk value associated with the identified vocalization nuance, the risk value corresponding to the risk of providing offensive content to the computer user of search results selected in conjunction with the identified vocalization nuance irrespective of whether the vocalization nuance accurately reflects some attribute of the computer user;
   identifying a plurality of search results corresponding to the textual representation of the audio query based, in part, on the identified vocalization nuance according to the confidence value and the risk value associated with the identified vocalization nuance;
   generating a search results presentation based on the identified plurality of search results; and
   returning the search results presentation to the computer user in response to receiving the audio query.

2. The computer implemented method of claim 1, wherein identifying a plurality of search results corresponding to the textual representation of the audio query in conjunction with the identified vocalization nuance associated with the audio query comprises:
   determining that the confidence value and the risk value associated with the identified vocalization nuance fall within predetermined acceptable thresholds;
   updating the textual representation of the audio query according to the identified vocalization nuance; and
   identifying a plurality of search results corresponding to the updated textual representation of the audio query in conjunction with the identified vocalization nuance.

3. The computer implemented method of claim 1, wherein generating a search results presentation based on the identified plurality of search results comprises generating an audio presentation of at least some of the identified search results.

4. The computer implemented method of claim 1 further comprising identifying an advertisement to be included with the search results presentation, the advertisement being selected according to the identified vocalization nuance; and
wherein generating a search results presentation based on the identified plurality of search results comprises generating a visual presentation based on the identified plurality of search results and the identified advertisement.

5. The computer implemented method of claim 1, wherein the identified vocalization nuance comprises a nuance corresponding to any one of gender, age, mood, emotion, urgency, ethnicity, country or region of origin, and social class.

6. The computer implemented method of claim 1, wherein identifying a vocalization nuance associated with the audio query comprises obtaining the vocalization nuance associated with the audio query from a third party service.

7. A computer readable medium bearing computer executable instructions which, when executed on a computing system comprising at least a processor executing the instructions retrieved from the medium, carry out a method for responding to an audio query from a computer user, the method comprising:
receiving an audio query from a computer user;
obtaining a textual representation of the audio query and vocalization nuances associated with the audio query;
obtaining confidence/risk value pairs corresponding the vocalization nuances, wherein the confidence value of a confidence/risk value pair identifies a confidence that the corresponding vocalization nuance correctly reflects a corresponding aspect of the computer user, and wherein the risk value of a confidence/risk value pair identifies a risk of providing offensive content to the computer user of search results selected in conjunction with the identified vocalization nuance irrespective of whether the vocalization nuance accurately reflects some attribute of the computer user;
identifying a plurality of search results corresponding to the textual representation of the audio query based, in part, on the identified vocalization nuance according to the confidence/risk value pairs associated with the identified vocalization nuance;
generating a search results presentation based on the identified plurality of search results; and
returning the search results presentation to the computer user in response to receiving the audio query.

8. The computer readable medium of claim 7, wherein obtaining a textual translation of the audio query comprises accessing an external translation service to obtain the textual translation of the audio query.

9. The computer readable medium of claim 7, wherein obtaining vocalization nuances associated with the audio query comprises accessing an external service to obtain the vocalization nuances associated with the audio query.

10. The computer readable medium of claim 7, wherein obtaining confidence/risk value pairs corresponding the vocalization nuances comprises accessing an external service to obtain the confidence/risk value pairs corresponding the vocalization nuances.

11. The computer readable medium of claim 7, wherein identifying a plurality of search results corresponding to the textual representation of the audio query in conjunction with the vocalization nuances associated with the audio query comprises:
determining that a confidence/risk value pair associated with at least one vocalization nuance falls within predetermined acceptable thresholds;
updating the textual representation of the audio query according to the at least one vocalization nuance; and
identifying a plurality of search results corresponding to the updated textual representation of the audio query in conjunction with the vocalization nuances.

12. The computer readable medium of claim 7, wherein generating a search results presentation based on the identified plurality of search results comprises generating an audio presentation of at least some of the identified search results.

13. The computer readable medium of claim 7, wherein the method further comprises:
identifying an advertisement to be included with the search results presentation, the advertisement being selected according to at least one of the vocalization nuances; and
wherein generating a search results presentation based on the identified plurality of search results comprises generating a visual presentation based on the identified plurality of search results and the identified advertisement.

14. A computer system for responding to an audio query, the system comprising a processor and a memory, wherein the processor executes instructions stored in the memory as part of or in conjunction with additional components to respond to receiving an audio query from a computer user, and causes the processor to:
enable a network communication component to communicate between the computer system and other computing devices over a network;
translate an audio query to a textual representation of the audio query;
identify vocalization nuances of the audio query;
generate a confidence value for each vocalization nuance of the identified vocalization nuances, wherein each confidence value is a part of a confidence/risk values pair corresponding to an vocalization nuance, and wherein each confidence value represents a confidence that a corresponding vocalization nuance correctly reflects a corresponding aspect of the computer user; and
provide a risk value corresponding to each vocalization nuance of the identified vocalization nuances, wherein each risk value is a part of a confidence/risk values pair corresponding to a vocalization nuance irrespective of whether the vocalization nuance accurately reflects some attribute of the computer user, and wherein each risk value represents a risk that content selected based on a corresponding vocalization nuance may be offensive;
identify a plurality of search results in response to receiving the audio query from a content data store and based, in part, on the vocalization nuances of the audio query and the corresponding confidence/risk value pairs of the vocalization nuances; and
generate a search results presentation for the computer user based on the identified plurality of search results and in light of the vocalization nuances of the audio query.

15. The computer system of claim 14, wherein the executed instructions further cause the processor to identify a plurality of search results in response to receiving the audio query from a content data store and in light of the vocalization nuances of the audio query whose confidence/risk value pairs fall within predetermined thresholds.

* * * * *